United States Patent
Zhao et al.

(10) Patent No.: US 10,057,345 B2
(45) Date of Patent: Aug. 21, 2018

(54) OPTIMIZATION OF A MULTI-CHANNEL SYSTEM USING A FEEDBACK LOOP

(71) Applicant: Google LLC, Mountain View, CA (US)

(72) Inventors: Chenyu Zhao, Mountain View, CA (US); Di Wang, Santa Clara, CA (US); Samuel Sze Ming Ieong, Mountain View, CA (US); Christopher K. Harris, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/290,940

(22) Filed: Oct. 11, 2016

(65) Prior Publication Data
US 2018/0103093 A1    Apr. 12, 2018

(51) Int. Cl.
G06F 15/16 (2006.01)
H04L 29/08 (2006.01)
(Continued)

(52) U.S. Cl.
CPC .... *H04L 67/1095* (2013.01); *G06F 17/30864* (2013.01); *G06F 17/30867* (2013.01);
(Continued)

(58) Field of Classification Search
CPC . H04L 67/1095; H04L 67/1097; H04L 67/20; H04L 67/322
(Continued)

(56) References Cited

U.S. PATENT DOCUMENTS 8,374,912 B2    2/2013 Paroz et al.
2007/0260514 A1    11/2007 Burdick et al.
(Continued)

FOREIGN PATENT DOCUMENTS

| WO | 2007/130265 | 11/2007 |
| WO | 2010/096428 | 8/2010 |
| WO | 2014/077937 | 5/2014 |

OTHER PUBLICATIONS

International Search Report and Written Opinion in International Application No. PCT/US2017/032883, dated Jul. 26, 2017, 14 pages.

*Primary Examiner* — Philip B Tran
(74) *Attorney, Agent, or Firm* — Fish & Richardson P.C.

(57) ABSTRACT

Methods, systems, and apparatus include computer programs encoded on a computer-readable storage medium, including a system that controls content distribution using a feedback loop. Content is distributed over multiple different online channels using a same initial maximum selection value for distribution over each different online channel. An observed distribution amount required for distribution of the content over the multiple different online channels is received through a feedback loop and for multiple different distributions of the content. Based on the observed distribution amount received through the feedback loop, a realized distribution amount is determined for the multiple different distributions across the multiple different online channels. The maximum selection value is adjusted based on a difference between the realized distribution amount and a reference distribution amount specified by a provider of the content. The content is distributed over the multiple different online channels using the adjusted maximum selection value.

20 Claims, 4 Drawing Sheets

(51) Int. Cl.
*G06F 17/30* (2006.01)
*G06Q 30/02* (2012.01)

(52) U.S. Cl.
CPC ..... *G06Q 30/0249* (2013.01); *G06Q 30/0277* (2013.01); *H04L 67/1097* (2013.01); *H04L 67/20* (2013.01); *H04L 67/322* (2013.01)

(58) Field of Classification Search
USPC .................................................. 709/219, 224
See application file for complete search history.

(56) References Cited

U.S. PATENT DOCUMENTS

| | | | |
|---|---|---|---|
| 2010/0223141 A1* | 9/2010 | Spencer | G06Q 30/02 705/14.71 |
| 2011/0071900 A1* | 3/2011 | Kamath | G06Q 30/02 705/14.46 |
| 2011/0191168 A1 | 8/2011 | Schroedl et al. | |
| 2011/0320262 A1 | 12/2011 | Symons et al. | |
| 2013/0018722 A1 | 1/2013 | Libby | |
| 2013/0067364 A1* | 3/2013 | Berntson | G06F 3/048 715/764 |
| 2014/0122253 A1* | 5/2014 | Vassilvitskii | G06Q 30/02 705/14.71 |
| 2014/0143066 A1 | 5/2014 | Liu et al. | |
| 2014/0222587 A1* | 8/2014 | Feldman | G06Q 30/0275 705/14.71 |
| 2015/0213485 A1 | 7/2015 | Wang et al. | |
| 2015/0269607 A1* | 9/2015 | Steube | G06Q 30/0244 705/14.43 |
| 2016/0085587 A1* | 3/2016 | Dube | G06F 9/5011 718/104 |
| 2016/0087909 A1* | 3/2016 | Chatterjee | H04L 47/70 709/226 |

* cited by examiner

OPTIMIZATION OF A MULTI-CHANNEL SYSTEM USING A FEEDBACK LOOP

BACKGROUND

This specification relates to optimizing a multi-channel system using a feedback loop.

The Internet provides access to a wide variety of resources. For example, video and/or audio files, as well as webpages for particular subjects or particular news articles, are accessible over the Internet. Access to these resources presents opportunities for third-party content to be provided with the resources. For example, a webpage can include slots in which content can be presented.

SUMMARY

In general, one aspect of the subject matter described in this specification can be implemented in systems that include one or more processing devices and one or more storage devices. One system includes a third-party content corpus database that stores information for various content that are available to be distributed to client devices. The system also includes a distributed computing environment, including multiple computing devices and a feedback loop. The distributed computing environment interacts with the third-party content corpus database and performs operations. The operations include: distributing content over multiple different online channels using a same initial maximum selection value for distribution over each different online channel; receiving, through the feedback loop and for multiple different distributions of the content, an observed distribution amount required for distribution of the content over the multiple different online channels; determining, based on the observed distribution amount received through the feedback loop, a realized distribution amount for the multiple different distributions across the multiple different online channels; adjusting the maximum selection value based on a difference between the realized distribution amount and a reference distribution amount specified by a provider of the content; and distributing the content over the multiple different online channels using the adjusted maximum selection value.

These and other implementations can each optionally include one or more of the following features. Adjusting the maximum selection value can include determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount. Adjusting the maximum selection value can include adjusting the maximum selection value by a capped adjustment amount when the difference between the realized distribution amount and the reference distribution amount is greater than a specified threshold difference. Determining the realized distribution amount can include determining an average distribution amount for distributing the content over the multiple different online channels based on the observed distribution amount required for each distribution of the content over the multiple different online channels. Determining the average distribution amount can include determining, for a given period of time, a ratio of a total observed distribution amount to a predicted user action rate for each distribution of the content during the given period of time, the total observed distribution amount being a total amount required to distribute the content over the given period of time. The distributed computing environment can perform operations that further include generating the initial maximum selection value based on the reference distribution amount and an initialization factor that causes the initial maximum selection value to be greater than the reference distribution amount. Distributing the content over the multiple different online channels can include distributing the content over each of a search engine channel and a streaming media channel.

In general, another innovative aspect of the subject matter described in this specification can be implemented in methods that include a method for distributing content. The method includes: distributing, by one or more servers, content over multiple different online channels using a same initial maximum selection value for distribution over each different online channel; receiving, through a feedback loop and for multiple different distributions of the content, an observed distribution amount required for distribution of the content over the multiple different online channels; determining, by the one or more servers and based on the observed distribution amount received through the feedback loop, a realized distribution amount for the multiple different distributions across the multiple different online channels; adjusting, by the one or more servers, the maximum selection value based on a difference between the realized distribution amount and a reference distribution amount specified by a provider of the content; and distributing, by the one or more servers, the content over the multiple different online channels using the adjusted maximum selection value.

These and other implementations can each optionally include one or more of the following features. Adjusting the maximum selection value can include determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount. Adjusting the maximum selection value can include adjusting the maximum selection value by a capped adjustment amount when the difference between the realized distribution amount and the reference distribution amount is greater than a specified threshold difference. Determining the realized distribution amount can include determining an average distribution amount for distributing the content over the multiple different online channels based on the observed distribution amount required for each distribution of the content over the multiple different online channels. Determining the average distribution amount can include determining, for a given period of time, a ratio of a total observed distribution amount to a predicted user action rate for each distribution of the content during the given period of time, the total observed distribution amount being a total amount required to distribute the content over the given period of time. The method can further include generating the initial maximum selection value based on the reference distribution amount and an initialization factor that causes the initial maximum selection value to be greater than the reference distribution amount. Distributing the content over the multiple different online channels can include distributing the content over each of a search engine channel and a streaming media channel.

In general, another aspect of the subject matter described in this specification can be implemented a non-transitory computer storage medium encoded with a computer program. The program can include instructions that when executed by a distributed computing system cause the distributed computing system to perform operations including distributing, by one or more servers, content over multiple different online channels using a same initial maximum selection value for distribution over each different online channel; receiving, through a feedback loop and for multiple different distributions of the content, an observed distribution amount required for distribution of the content over the multiple different online channels; determining, by the one or more servers and based on the observed distribution amount received through the feedback loop, a realized distribution amount for the multiple different distributions across the multiple different online channels; adjusting, by the one or more servers, the maximum selection value based on a difference between the realized distribution amount and a reference distribution amount specified by a provider of the content; and distributing, by the one or more servers, the content over the multiple different online channels using the adjusted maximum selection value.

These and other implementations can each optionally include one or more of the following features. Adjusting the maximum selection value can include determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount. Adjusting the maximum selection value can include adjusting the maximum selection value by a capped adjustment amount when the difference between the realized distribution amount and the reference distribution amount is greater than a specified threshold difference. Determining the realized distribution amount can include determining an average distribution amount for distributing the content over the multiple different online channels based on the observed distribution amount required for each distribution of the content over the multiple different online channels. Determining the average distribution amount can include determining, for a given period of time, a ratio of a total observed distribution amount to a predicted user action rate for each distribution of the content during the given period of time, the total observed distribution amount being a total amount required to distribute the content over the given period of time. The operations can further include generating the initial maximum selection value based on the reference distribution amount and an initialization factor that causes the initial maximum selection value to be greater than the reference distribution amount.

Implementations of the subject matter described in this specification can provide one or more of the following advantages. A maximum selection value that is used to transmit third-party content over multiple different transmission channels can be dynamically modified over time (e.g., in real-time or near real-time) so that the aggregate distribution amount required to transmit the third-party content over the multiple different transmission channels meets a reference distribution amount. The modification of the maximum selection value also ensures that the third-party content is distributed efficiently across all of the multiple different transmission channels even when the different transmission channels are unrelated or independent from each other. In some implementations, the modifications to the maximum selection value are made more quickly by using a realized distribution value is expected to be observed rather than waiting a longer period of time to use historical distribution value information. This also prevents delays resulting from information that will only be obtained at a future time (e.g., conversion information) from negatively impacting the ability to modify the maximum selection value or delaying modification of the maximum selection value.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for dynamically modifying transmission channels using a feedback loop. For example, the feedback loop can be used to modify transmission of third-party content that is being transmitted based on a single set of channel independent values (e.g., that are used to transmit the third-party content across the multiple different online channels). The values can include or be limited to a total planned maximum distribution amount and a reference distribution amount, both values specified a single time, such as when a content selection plan is defined by a content provider. The content provider does need not to specify online channel-specific values or be concerned with the differences of content selection and resulting user actions for each channel. For example, based on content provider inputs, an initial maximum selection value can be set (e.g., in the content selection plan) for the distribution of content over each of the different online channels. Using the feedback loop and after multiple different distributions of the content, an observed distribution amount required for distribution of the content over the multiple different online channels can be received or determined. Based on the observed distribution amount received through the feedback loop, a realized distribution amount can be determined for the multiple different distributions across the multiple different online channels. The maximum selection value can be adjusted (e.g., from the initial value or from the currently set value) based on a difference between the realized distribution amount and a reference distribution amount specified by a provider of the content. Using the adjusted maximum selection value, the distribution of the content over the multiple different online channels can continue.

Figure 1:
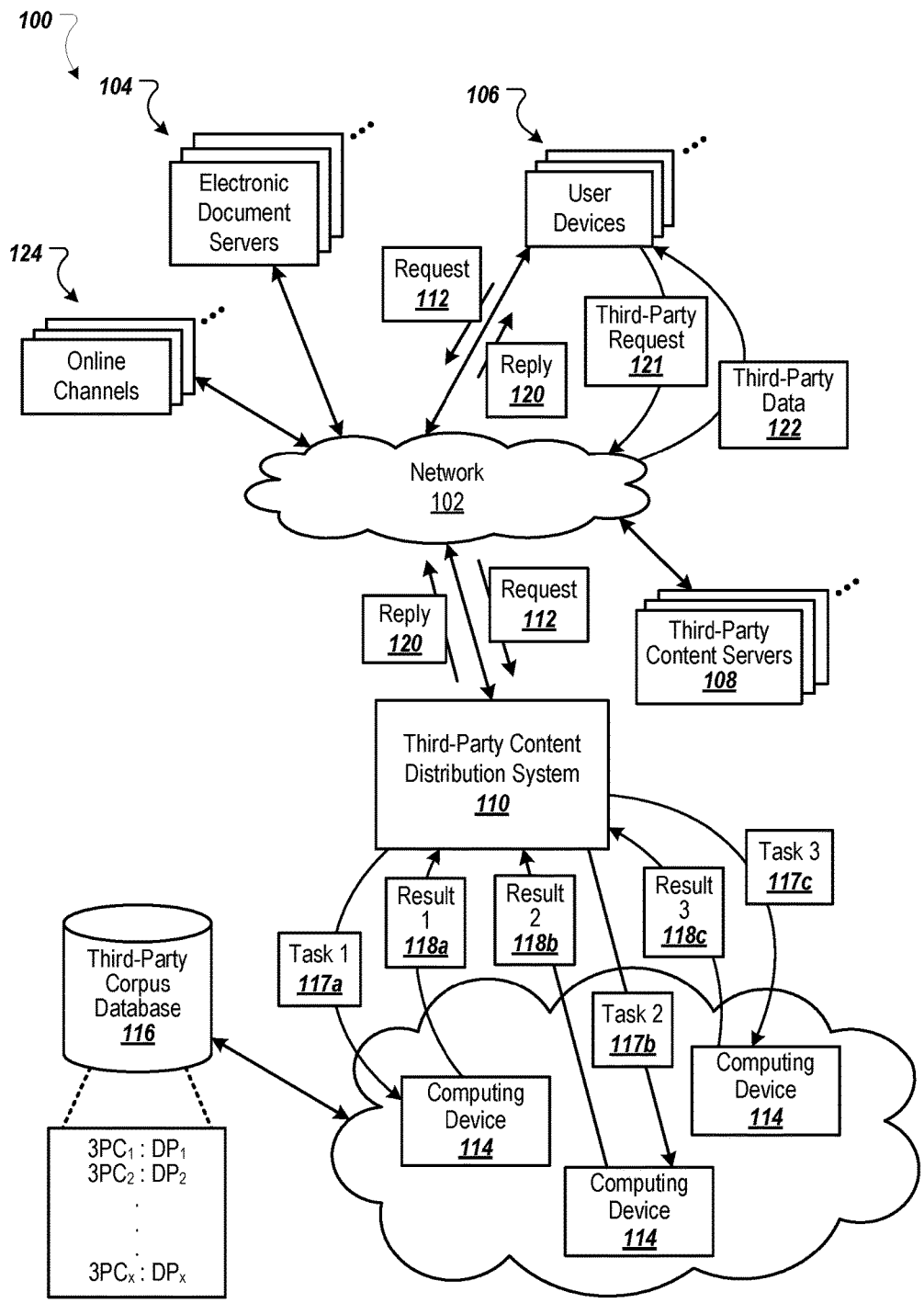
FIG. 1 is a block diagram of an example environment in which third-party content is distributed for presentation with electronic documents.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108. In some implementations, the environment 100 includes multiple different online channels 124, e.g., search engine channels, streaming media channel, and other channels through which content can be distributed.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request 112 for third-party content, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the third-party content distribution system 110. Similarly, data specifying keywords designated for the selection of the electronic document ("document keywords") or entities (e.g., people, places, or things) that are referenced by the electronic document can also be included in the request 112 (e.g., as payload data) and provided to the third-party content distribution system 110 to facilitate identification of third-party content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 106 can also be provided in the request 112, such as information that identifies a model of the user device 106, a configuration of the user device 106, or a size (e.g., physical size or resolution) of an electronic display (e.g., touchscreen or desktop monitor) on which the electronic document is presented. Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content (e.g., information about apps) that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document to remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system (or environment) that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content (3PC1-x). The millions of available third-party content can be indexed, for example, in a third-party corpus database 116. Each third-party content index entry can reference the corresponding third-party content and/or include distribution parameters (DP1-DPx) (e.g. selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation.

The identification of the eligible third-party content can be segmented into multiple tasks 117a-117c that are then assigned among computing devices within the set of multiple computing devices 114. For example, different computing devices in the set of multiple computing devices 114 can each analyze a different portion of the third-party corpus database 116 to identify various third-party content having distribution parameters that match information included in the request 112. In some implementations, each given computing device in the set of multiple computing devices 114 can analyze a different data dimension (or set of dimensions) and pass results 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request 121 to the third-party content server 108 to obtain a given winning third-party content from the third-party content server 108. In response to the request, the third-party content server 108 will transmit, to the user device 106, third-party data 122 that causes the given winning third-party content to be incorporated into the electronic document and presented at the user device 106.

The third-party content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

In some implementations, the third-party content distribution system 110 may select winning third-party content in response to a given request from among a set of third-party content items (e.g., instances of third-party content) that have been deemed eligible to return to the user device 106 in response to that request. Eligible third-party content can be identified on a per-request basis according to various data specified in the request, or context associated with the request. For example, the request may indicate a permissible size or aspect ratio of the requested third-party content, and the third-party content distribution system 110 may filter the total set of available third-party content to a set of eligible content that satisfies the size or aspect ratio constraint, and any other applicable constraints. The evaluation process for selecting winning third-party content can then be performed only with respect to the set of eligible third-party content. In some examples, the evaluation process may involve scoring and ranking third-party content items. The winning third-party content item may be the highest-ranked item according to the scores. In some implementations, the ineligible third-party content may be excluded from the total set of available content before the content is scored and ranked. In some implementations, the ineligible third-party content may be excluded from the total set of available content after the content is scored and ranked.

Figure 2:
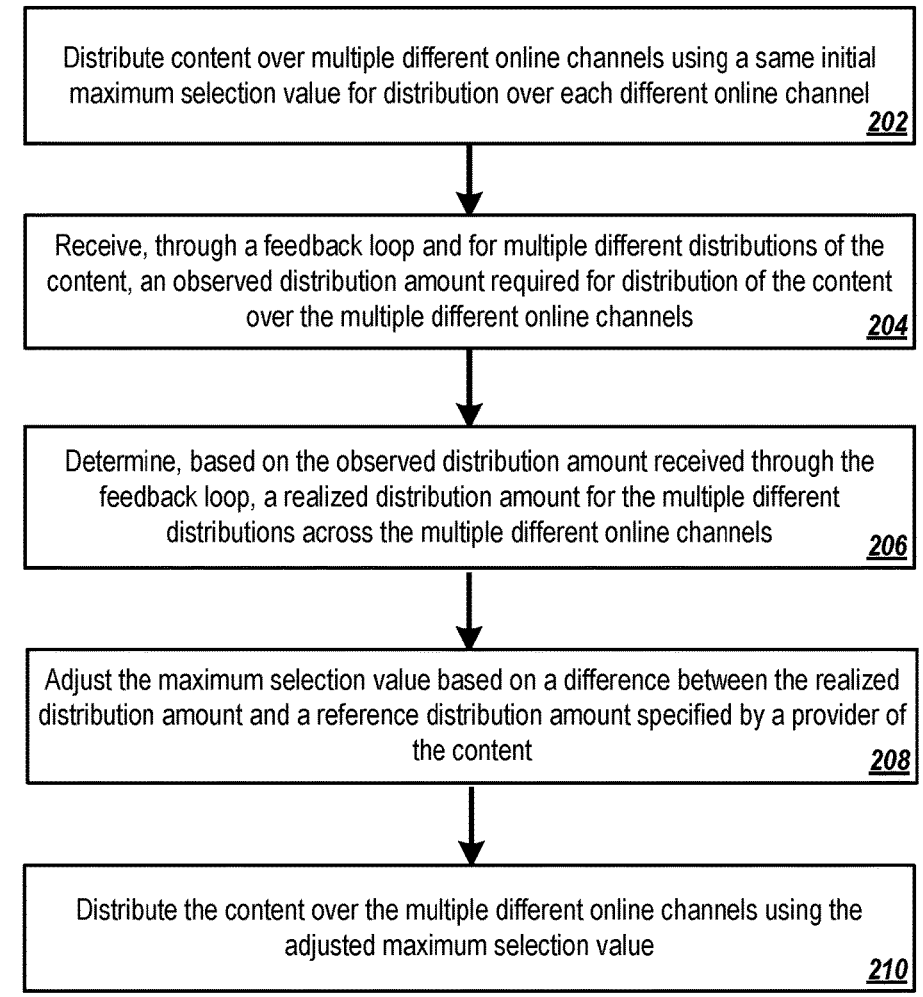
FIG. 2 is a flowchart of an example process for using a feedback loop to control the distribution of content.
Figure 3:
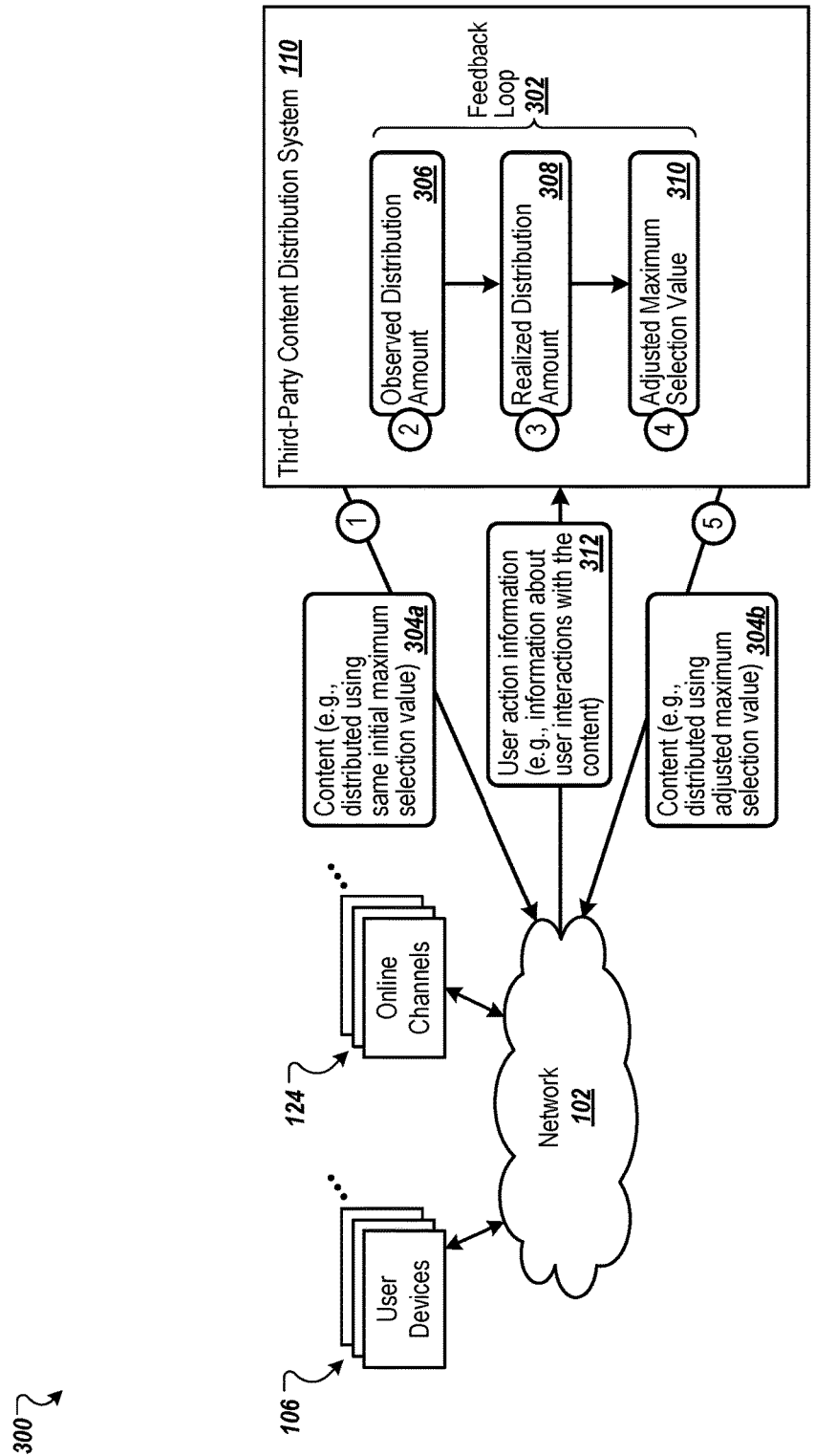
FIG. 3 shows an example system for using a feedback loop to control the distribution of content.

As described further with respect to FIGS. 2-3, the third-party content distribution system 110 can control content distribution using a feedback loop. In some implementations, a maximum selection value (e.g., a maximum cost-per-action "CPA" bid) can be changed automatically based on information received through the feedback loop. For example, based on an observed distribution amount (e.g., a total cost of distributing third-party content for a given content provider), a realized distribution amount (e.g., an expected CPA for distributing the third-party content over a specified period of time), and a reference distribution amount (e.g., a target CPA specified by a content provider).

For purposes of example, assume that a content provider specifies a reference distribution amount of 5.0 for distribution of their third-party content. The reference distribution amount can be an average content distribution amount, such as a target cost-per-action, that is specified by the content sponsor initially and/or adjusted over time. Although the reference distribution amount is specified to be 5.0, the third-party content distribution system 110 may use a higher amount, such as 6.0, as the initial maximum selection value (e.g., bid or other value used for purposes of selecting third-party content that will be distributed) in an attempt to achieve the reference distribution amount of 5.0.

The content distribution system 110 can automatically adjust the maximum selection value over time based on a difference between the realized distribution amount for the content provider and the reference distribution amount specified by the content provider. For example, using information provided through the feedback loop at one point in time, the third-party content distribution system 110 can determine that the expected distribution amount (e.g., observed distribution amount/predicted user action rate) is less than the reference distribution amount, and in response to the determination, increase the maximum selection value to a higher level, such as 7.0. The increased maximum selection value will cause the expected distribution amount to increase toward the reference distribution amount of 5.0, as discussed in more detail below. Similarly, when the expected distribution amount is determined to be greater than the reference distribution amount (e.g., based on the information provided through the feedback loop at a different point in time), the third-party content distribution system 110 can decrease the maximum selection value to a lower level, such as 4.0 (or some other value). The decreased maximum selection value will cause the expected distribution amount to decrease toward the reference distribution amount. Thus, using the information provided through the feedback loop, the third-party content distribution system 110 can continually, automatically, and iteratively adjust the selection value to more accurately achieve the reference distribution amount specified by the content provider, even where the third-party content is being distributed over various different kinds of channels at various different levels of costs per action.

In some implementations, the content distribution system 110 can automatically adjust the maximum selection value over time based on a current difference between a maximum spend amount specified by the content provider and a planned maximum spend amount (e.g., maximum budget) specified by the content provider. The difference, for example, can be a difference between a real-time indicator of a goal spend amount (e.g., 1000.0) that the content provider has specified versus an absolute maximum (e.g., 1200.0) that the content provider has specified can be spent. Over time, if the goal spend amount has been reached, or if the goal amount is predicted (e.g., based on content that has been provided) to exceed the goal spend amount during a time period specified for the selection of the content provider's content, then the maximum selection value can be adjusted downward as part of the feedback loop. Doing so can avoid the situation in which the planned maximum spend amount is reached (or is predicted to be reached too fast), or the absolute maximum is reached at all. The change in the adjustment the maximum selection value can also depend on other criteria, such as a current difference between the realized distribution amount for the content provider and the reference distribution amount specified by the content provider, as described above. Additionally, if the goal spend amount has not been reached (or is not predicted to be reached within a time period specified for providing the content provider's content), then the maximum selection value can be increased as part of the feedback loop.

FIG. 2 is a flowchart of an example process 200 for optimizing a multi-channel system using a feedback loop. The optimization can include, for example, identifying a single maximum selection value (e.g., a single ranking score, CPA bid, or another selection value) to use for distribution of third-party content provided by a particular content provider across the multiple different channels of the system. In some implementations, the third-party content distribution system 110 and components that it includes can perform operations of the process 200. In some implementations, operations of the process 200 can be implemented by one or more servers and a memory device storing instructions that are executed by one or more servers. Operations of the process 200 can also be implemented using computer-readable instructions that are stored on a non-transitory computer readable medium, such that when the instructions are executed by one or more computing devices (e.g., servers), the instructions cause the one or more computing devices to perform operations of the process 200. The process 200 is described with reference to FIGS. 1 and 3 in order to identify example structures for performing the operations of the process 200. For example, stages 1-5 in FIG. 3 (discussed below) correspond to operations 202-210, respectively.

FIG. 3 shows an example system 300 for optimizing a multi-channel system using a feedback loop 302. In some implementations, the third-party content distribution system 110 can use information obtained and/or processed in the feedback loop 302 to manage distribution of third-party content (e.g., content 304a, 304b) through the multiple different online channels 124 using a same selection value across all of the channels. For example, as third-party content is distributed though the multiple channels, user action information 312 specifying user actions (e.g., conversions such as purchases, file/application downloads, e-mail list sign-ups, etc.) that are attributed to presentation of the third-party content is fed through the feedback loop 302, and used to make adjustments to the same selection value that is used to control distribution of content through all of the various transmission channels.

The user action information 312 can identify, for example, the particular one of the multiple different online channels 124 (e.g., search engines, publisher web pages, application stores, video streaming services, audio streaming services, etc.) on which a particular user action occurred. The user action information 312 can also identify specific users or categories of users that performed the user actions, dates and times of the user actions, device types (e.g., mobile versus non-mobile) through which the user actions were performed, geographic and/or location information where the user actions occurred, and/or other information that can about a specific user action that is attributable to a specific presentation of content. Although the feedback loop 302 is shown as including elements 306-310, the elements of the feedback loop 302 can be different as needed to control content distribution in an efficient way, e.g., to improve the transmission of content over the multiple different online channels 124 using a same selection value.

Referring again to FIG. 2 and the process 200, content is distributed over multiple different online channels using a same initial maximum selection value for distribution over each different online channel (202). In some implementations, the third-party content distribution system 110 can distribute (e.g., at stage 1 in FIG. 3) content 304*a* using initial selection values. Selection values can be any quantitative value (e.g., a score, a weight, a bid, etc.) that is used to determine which third-party content will be selected for distribution at any given point in time. For example, selection values for various third-party content can be obtained from a data store and compared to rank the various third-party content (e.g., in descending order of selection values). The highest ranked third-party content will generally be selected for distribution.

In some implementations, the same initial maximum selection value (e.g., max CPA bid) used to distribute third-party content for a given content provider can be generated, for example, based on the reference distribution amount (e.g., target CPA amount) that has been specified by the given content provider and an initialization factor that causes the initial maximum selection value to be greater than the reference distribution amount. In some implementations, the initialization factor can be determined by analyzing historical prices across the various channels and/or in other ways. For example, historical distribution amounts required to distribute content on video streaming services may be higher, on average, than historical distribution amounts required to distribute content on other online channels, and historical distribution amounts required to distribute content on search engines may be lower, on average, than historical distribution amounts required to distribute content on the other online channels.

Using information regarding the variance of historical distribution amounts required to distribute content on the various channels in combination with other factors (e.g., a distribution percentage of content provided on each of the various channels), the initialization factor can be selected for use in setting the initial maximum selection value. An initialization factor of 120% (also expressed as 1.2), for example, can cause the initial maximum selection value (e.g., 6.0) to be 20% higher than the reference distribution amount (e.g., 5.0) specified by the given content provider. In this way, at least during an initial period in which the given content provider's content is selected for distribution, the maximum selection value will be set higher than the reference distribution amount. This difference between the maximum selection value and the reference distribution amount can continue, for example, until changed through a feedback loop.

An observed distribution amount (e.g., observed/actual CPA amount) required for distribution of the content that has occurred over the multiple different online channels is received through the feedback loop and for multiple different distributions of the content (204). In some implementations, the observed distribution amount 306 can be determined by the system as the system tracks the amount the content provider has submitted so far for the distribution of the content over the various channels. This can occur, for example, after the system tracks (and stores over time) an amount submitted by a given content provider for distribution of their content over the various channels.

Based on the observed distribution amount received through the feedback loop, a realized distribution amount is determined for the multiple different distributions across the multiple different online channels (206). For example, based on information identifying and quantifying the results of (e.g., user interactions with) the distribution of at least content 204*a* that is distributed by the third-party content distribution system 110, the third-party content distribution system 110 can determine (e.g., at stage 3 in FIG. 3) a realized distribution amount 308 (e.g., an expected CPA). For example, the realized distribution amount can be determined as a function of observed distribution amount divided by a predicted user action rate (e.g., conversion rate), such as based on a cost of providing the content relative to a number of specified user actions with the content (e.g., post-click conversions). The realized distribution amount (e.g., 6.0) can identify, e.g., based on the function, an expected cost-per-action that will be realized using the current cost-per-action bid (i.e., selection value).

In some implementations, determining the realized distribution amount can include determining an average distribution amount for distributing the content over the multiple different online channels based on the observed distribution amount required for each distribution of the content over the multiple different online channels. For example, the third-party content distribution system 110 can determine different distribution amounts for each of the multiple different online channels 124. Using the different distribution amounts, for example, the third-party content distribution system 110 can calculate an average distribution amount (e.g., an average CPA) across all of the multiple different online channels 124. In some implementations, the average distribution amount can be determined using, for example, a weighted average, such as by assigning a greater weight to channels based on volume of distributed content.

In some implementations, determining the average distribution amount can include determining, for a given period of time, a ratio of a total observed distribution amount to a predicted user action rate for each distribution of the content during the given period of time, the total observed distribution amount being a total amount required to distribute the content over the given period of time. For example, the third-party content distribution system 110 can compute the realized distribution amount as a function of total spend divided by pCVR.

The maximum selection value is adjusted based on a difference between the realized distribution amount and a reference distribution amount specified by a provider of the content (208). For example, based on cost-per-action determinations and the observed distribution amount received through the feedback loop 302, the third-party content distribution system 110 can adjust (e.g., at stage 4 in FIG. 3) the maximum cost-per-action, creating an adjusted maximum selection value 310. The adjustment can occur, for example, whenever the current value of the realized distribution amount differs (e.g., by a threshold amount or by a threshold percentage) from the reference distribution amount specified by content provider. As an example, the maximum cost-per-action can be adjusted up to 7.0. The maximum cost-per-action can be adjusted iteratively, over time.

In some implementations, adjusting the maximum selection value can include determining a difference between the realized distribution amount and the reference distribution amount, and the maximum selection value can be adjusted in proportion to the difference between the realized distribution amount and the reference distribution amount. The adjusting can include increasing the maximum selection value in proportion to the difference when the realized distribution amount is less than the reference distribution amount. The adjusting can also include decreasing the maximum selection value in proportion to the difference when the realized distribution amount is greater than the reference distribution amount. For example, the third-party content distribution system 110 can adjust (e.g., either by increasing or decreasing) the maximum cost-per-action selection value in proportion to a difference between the realized distribution amount and the reference distribution amount. The adjustment can occur, for example, when the third-party content distribution system 110 determines that the difference between the realized distribution amount and the reference distribution amount exceeds a given amount or a given percentage. In some implementations, given amounts and/or given percentages can be specific to one, some, or all content providers.

In some implementations, adjusting the maximum selection value can include adjusting the maximum selection value by a capped adjustment amount when the difference between the realized distribution amount and the reference distribution amount is greater than a specified threshold difference. For example, the third-party content distribution system 110 can adjust the maximum cost-per-action selection value by an amount that is below a pre-determined value, or by a value that is below a maximum percentage of the currently-set maximum cost-per-action. Using a capped adjustment amount, for example, can provide stability of the system 300 by preventing large swings in selection values.

The content is distributed over the multiple different online channels using the adjusted maximum selection value (210). For example, using a new maximum selection value of 7.0, the third-party content distribution system 110 can distribute (e.g., at stage 5 in FIG. 3) content 304b to the multiple different online channels 124 (e.g., search engine channels, streaming media channel, and other channels) using the new maximum selection value.

In some implementations, the process 200 can further include generating the initial maximum selection value based on the reference distribution amount and an initialization factor that causes the initial maximum selection value to be greater than the reference distribution amount. As an example, the third-party content distribution system 110 can initialize the maximum cost-per-action as a function of reference distribution amount times a constant.

The feedback loop 302 can typically operate autonomously, e.g., without periodic intervention from the content provider. In some implementations, the feedback loop 302 can include one or more aspects of notifying the content provider of issues, and receiving and processing inputs from the content provider. For example, determinations and calculations made in the feedback loop 302 may indicate that there is a problem with the content selection plan or with the content provider's initial inputs (e.g., total planned maximum distribution amount and maximum cost-per-action). As such, the process 200 can further include additional operations, e.g., a notification-related operations and one or more updating/processing operations (e.g., that use the content provider's inputs). Other notifications can periodically be made to the content provider, e.g., to indicate how the content selection plan is going, what the current maximum selection value is, or to provide statistical information about user actions that occurred subsequent to the distribution of content.

In some implementations, statistics regarding the selection of content and subsequent user actions can be gathered and/or calculated regularly and used in the feedback loop 302. For example, a predicted average cost-per-action and an average maximum cost-per-action, both of which can be, can be gathered from n days of logs. In some implementations, information used in the feedback loop 302 can be weighted based on how recently user actions being reported were performed. For example, a number of user actions that have occurred in the last 24 hours can be weighted higher than the same number of user actions that occurred over an earlier period.

In some implementations, calculations made in the feedback loop 302 can include the use of a predicted user action rate in addition to information about actual user actions. Using various types of information can provide an advantage of factoring in delays that occur for user actions after the presentation of content. In some implementations, delays that occur (and that are considered and/or predicted) can be different for the multiple different online channels 124.

Figure 4:
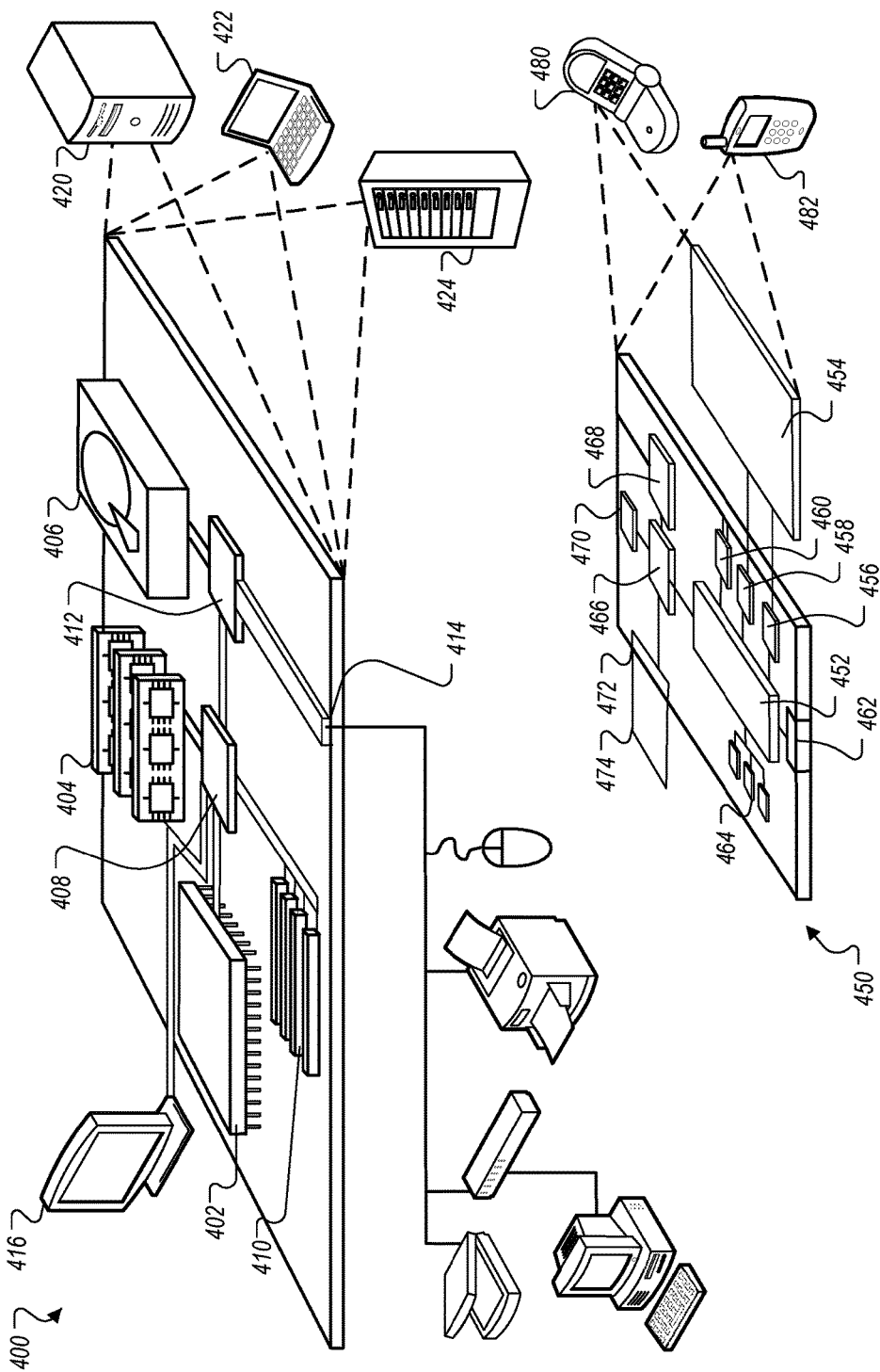
FIG. 4 is a block diagram of an example computer system that can be used to implement the methods, systems and processes described in this disclosure.

FIG. 4 is a block diagram of example computing devices 400, 450 that can be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a third-party content corpus database that stores information for various content that are available to be distributed to client devices; and
   a distributed computing environment, including multiple computing devices and a feedback loop wherein the distributed computing environment interacts with the third-party content corpus database and performs operations comprising:
      distributing content over multiple different online channels using a same initial maximum selection value for distribution over each different online channel, wherein the feedback loop is configured to obtain feedback about the distributions and adjust a transmission of content over the multiple different online channels by adjusting the same initial maximum selection value;
      receiving, through the feedback loop and for multiple different distributions of the content over the multiple different online channels, an observed distribution amount required for distribution of the content to client devices over the multiple different online channels;
      determining, based on the observed distribution amount received through the feedback loop, a realized distribution amount for the multiple different distributions across the multiple different online channels;

adjusting the same initial maximum selection value for the multiple different online channels based on a difference between the realized distribution amount and a reference distribution amount specified by a provider of the content; and distributing the content over the multiple different online channels using the adjusted maximum selection value.

2. The system of claim 1, wherein adjusting the maximum selection value comprises:

determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount.

3. The system of claim 2, wherein adjusting the maximum selection value comprises adjusting the maximum selection value by a capped adjustment amount when the difference between the realized distribution amount and the reference distribution amount is greater than a specified threshold difference.

4. The system of claim 1, wherein determining the realized distribution amount comprises determining an average distribution amount for distributing the content over the multiple different online channels based on the observed distribution amount required for each distribution of the content over the multiple different online channels.

5. The system of claim 4, wherein determining the average distribution amount comprises determining, for a given period of time, a ratio of a total observed distribution amount to a predicted user action rate for each distribution of the content during the given period of time, the total observed distribution amount being a total amount required to distribute the content over the given period of time.

6. The system of claim 1, wherein the distributed computing environment performs operations further comprising generating the initial maximum selection value based on the reference distribution amount and an initialization factor that causes the initial maximum selection value to be greater than the reference distribution amount.

7. The system of claim 1, wherein distributing the content over the multiple different online channels comprises distributing the content over each of a search engine channel and a streaming media channel.

8. A method, comprising:

distributing, by one or more servers in a distributed computing environment, content over multiple different online channels using a same initial maximum selection value for distribution over each different online channel, wherein the feedback loop is configured to obtain feedback about the distributions and adjust a transmission of content over the multiple different online channels by adjusting the same initial maximum selection value;

receiving, through a feedback loop and for multiple different distributions of the content over the multiple different online channels, an observed distribution amount required for distribution of the content to client devices over the multiple different online channels;

determining, by the one or more servers and based on the observed distribution amount received through the feedback loop, a realized distribution amount for the multiple different distributions across the multiple different online channels;

adjusting, by the one or more servers, the same initial maximum selection value for the multiple different online channels based on a difference between the realized distribution amount and a reference distribution amount specified by a provider of the content; and distributing, by the one or more servers, the content over the multiple different online channels using the adjusted maximum selection value.

9. The method of claim 8, wherein adjusting the maximum selection value comprises:

determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount.

10. The method of claim 9, wherein adjusting the maximum selection value comprises adjusting the maximum selection value by a capped adjustment amount when the difference between the realized distribution amount and the reference distribution amount is greater than a specified threshold difference.

11. The method of claim 8, wherein determining the realized distribution amount comprises determining an average distribution amount for distributing the content over the multiple different online channels based on the observed distribution amount required for each distribution of the content over the multiple different online channels.

12. The method of claim 11, wherein determining the average distribution amount comprises determining, for a given period of time, a ratio of a total observed distribution amount to a predicted user action rate for each distribution of the content during the given period of time, the total observed distribution amount being a total amount required to distribute the content over the given period of time.

13. The method of claim 8, further comprising generating the initial maximum selection value based on the reference distribution amount and an initialization factor that causes the initial maximum selection value to be greater than the reference distribution amount.

14. The method of claim 8, wherein distributing the content over the multiple different online channels comprises distributing the content over each of a search engine channel and a streaming media channel.

15. A computer program product embodied in a non-transitory computer-readable medium including instructions, that when executed, cause one or more processors to perform operations comprising:

distributing, by one or more servers, content over multiple different online channels using a same initial maximum selection value for distribution over each different online channel, wherein the feedback loop is configured to obtain feedback about the distributions and adjust a transmission of content over the multiple different online channels by adjusting the same initial maximum selection value;

receiving, through a feedback loop and for multiple different distributions of the content over the multiple different online channels, an observed distribution amount required for distribution of the content to client devices over the multiple different online channels;

determining, by the one or more servers and based on the observed distribution amount received through the feedback loop, a realized distribution amount for the multiple different distributions across the multiple different online channels;

adjusting, by the one or more servers, the same initial maximum selection value for the multiple different online channels based on a difference between the realized distribution amount and a reference distribution amount specified by a provider of the content; and distributing, by the one or more servers, the content over the multiple different online channels using the adjusted maximum selection value.

16. The computer program product of claim 15, wherein adjusting the maximum selection value comprises:

determining a difference between the realized distribution amount and the reference distribution amount; and adjusting the maximum selection value in proportion to the difference between the realized distribution amount and the reference distribution amount, including increasing the maximum selection value in proportion to the difference when the realized distribution amount is less than the reference distribution amount and decreasing the maximum selection value in proportion to the difference when the realized distribution amount is greater than the reference distribution amount.

17. The computer program product of claim 16, wherein adjusting the maximum selection value comprises adjusting the maximum selection value by a capped adjustment amount when the difference between the realized distribution amount and the reference distribution amount is greater than a specified threshold difference.

18. The computer program product of claim 15, wherein determining the realized distribution amount comprises determining an average distribution amount for distributing the content over the multiple different online channels based on the observed distribution amount required for each distribution of the content over the multiple different online channels.

19. The computer program product of claim 18, wherein determining the average distribution amount comprises determining, for a given period of time, a ratio of a total observed distribution amount to a predicted user action rate for each distribution of the content during the given period of time, the total observed distribution amount being a total amount required to distribute the content over the given period of time.

20. The computer program product of claim 15, the operations further comprising generating the initial maximum selection value based on the reference distribution amount and an initialization factor that causes the initial maximum selection value to be greater than the reference distribution amount.

* * * * *

UNITED STATES PATENT AND TRADEMARK OFFICE
CERTIFICATE OF CORRECTION

PATENT NO. : 10,057,345 B2
APPLICATION NO. : 15/290940
DATED : August 21, 2018
INVENTOR(S) : Zhao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 25 days.

Signed and Sealed this
Twenty-third Day of April, 2019

Andrei Iancu
*Director of the United States Patent and Trademark Office*